US009154484B2

(12) United States Patent
Wing et al.

(10) Patent No.: US 9,154,484 B2
(45) Date of Patent: Oct. 6, 2015

(54) IDENTITY PROPAGATION

(71) Applicant: Cisco Technology, Inc., San Jose, CA (US)

(72) Inventors: Daniel G. Wing, San Jose, CA (US);
Srinivas Chivukula, Bangalore (IN);
Tirumaleswar Reddy, Bangalore (IN);
Prashanth Patil, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 42 days.

(21) Appl. No.: 13/773,157

(22) Filed: Feb. 21, 2013

(65) Prior Publication Data
US 2014/0237539 A1    Aug. 21, 2014

(51) Int. Cl.
*H04L 29/06* (2006.01)
*H04L 29/08* (2006.01)
*H04L 29/12* (2006.01)

(52) U.S. Cl.
CPC .............. *H04L 63/08* (2013.01); *H04L 63/20* (2013.01); *H04L 69/161* (2013.01); *H04L 69/22* (2013.01); *H04L 61/2514* (2013.01); *H04L 67/02* (2013.01); *H04L 67/146* (2013.01)

(58) Field of Classification Search
CPC . H04L 63/0227; H04L 63/0236; H04L 67/14; H04L 67/02; H04L 45/308; H04L 61/00; H04L 69/22; H04L 69/161; H04L 67/146; H04L 63/20; H04L 63/08; H04L 61/2514
See application file for complete search history.

(56) References Cited

U.S. PATENT DOCUMENTS

| | | | | |
|---|---|---|---|---|
| 6,795,917 | B1* | 9/2004 | Ylonen | 713/160 |
| 8,200,971 | B2* | 6/2012 | Edwards | 713/168 |
| 8,675,488 | B1* | 3/2014 | Sidebottom et al. | 370/235 |
| 2004/0068569 | A1* | 4/2004 | Liao et al. | 709/228 |
| 2005/0015601 | A1* | 1/2005 | Tabi | 713/182 |
| 2006/0080446 | A1* | 4/2006 | Bahl | 709/227 |
| 2007/0005801 | A1* | 1/2007 | Kumar et al. | 709/238 |
| 2008/0072307 | A1* | 3/2008 | Maes | 726/12 |
| 2010/0235880 | A1* | 9/2010 | Chen et al. | 726/1 |
| 2012/0221674 | A1* | 8/2012 | Ritter et al. | 709/217 |
| 2013/0318581 | A1* | 11/2013 | Counterman | 726/7 |

OTHER PUBLICATIONS

Yourtchenko et al. (http://tools.ietf.org/html/draft-wing-nat-reveal-option-03, "Revealing hosts sharing an IP address using TCP option, draft-wing-nat-reveal-option-03", Dec. 8, 2011).*
"Middleware Architecture", Keystone 2013.1 documentation, accessed Jan. 18, 2013.

(Continued)

*Primary Examiner* — Andrew Nalven
*Assistant Examiner* — Mary Li
(74) *Attorney, Agent, or Firm* — Lempia Summerfield Katz LLC

(57) ABSTRACT

In one implementation, identity based security features and policies are applied to endpoint devices behind an intermediary device, such as a network address translation device. The access network switch authenticates an endpoint based on a user identity and a credential. A hypertext transfer protocol (HTTP) packet is generated or modified to include the user identity in an inline header. The HTTP packet including the user identity is sent to a policy enforcement device to look up one or more policies for the endpoint. The access switch receives traffic from the policy enforcement device that is filtered according the user identity. Subsequent TCP connections may also include identity information within the TCP USER_HINT option in a synchronization packet thus allowing identity propagation for other applications and protocols.

14 Claims, 8 Drawing Sheets

(56) References Cited

OTHER PUBLICATIONS

Ronnie Dale Huggins "Web Access Management and Single Sign-On" Accessed Nov. 7, 2012.

T. Narten et al., "Privacy Extensions for Stateless Address Autoconfiguration in IPv6", RFC 4941, Network Working Group, Sep. 2007.

A. Yourtchenko et al., "Revealing Host Sharing an IP Address Using TCP Option Draft-Wing-Nat-Reveal-Option-03", draft-wing-nat-reveal-option-03, Dec. 2011.

R. Yavatkar et al., "A Framework for Policy-Based Admission Control", RFC 2753, Jan. 2000.

* cited by examiner

IDENTITY PROPAGATION

TECHNICAL FIELD

This disclosure relates in general to the field of identity propagation for network devices.

BACKGROUND

For decades, it has been known that Internet Protocol version 4 addresses would eventually be exhausted. The 32 bit system provides only about 4.3 billion possible IP addresses. One significant effort to delay exhaustion of IP addresses involves network address translation (NAT). A NAT device modifies IP address information in packet headers as the packets leave one network and enter another. Often, a reverse process is performed for data packets traveling in the opposite direction. In one sense, NAT devices "hide" entire address spaces behind a single IP address. The hidden addresses no longer need to be unique. Thus, many more than 4.3 billion devices may be connected to the Internet.

However, some Internet services rely on identity-based policies for individual user devices. If two user devices are behind the same NAT device, the two user devices may appear to have the same IP addresses to some Internet services. As a result, some current authentication infrastructures cannot adequately provide identity-based Internet services.

BRIEF DESCRIPTION OF THE DRAWINGS

Exemplary embodiments of the present embodiments are described herein with reference to the following drawings.

DESCRIPTION OF EXAMPLE EMBODIMENTS

Overview

Figure 1:
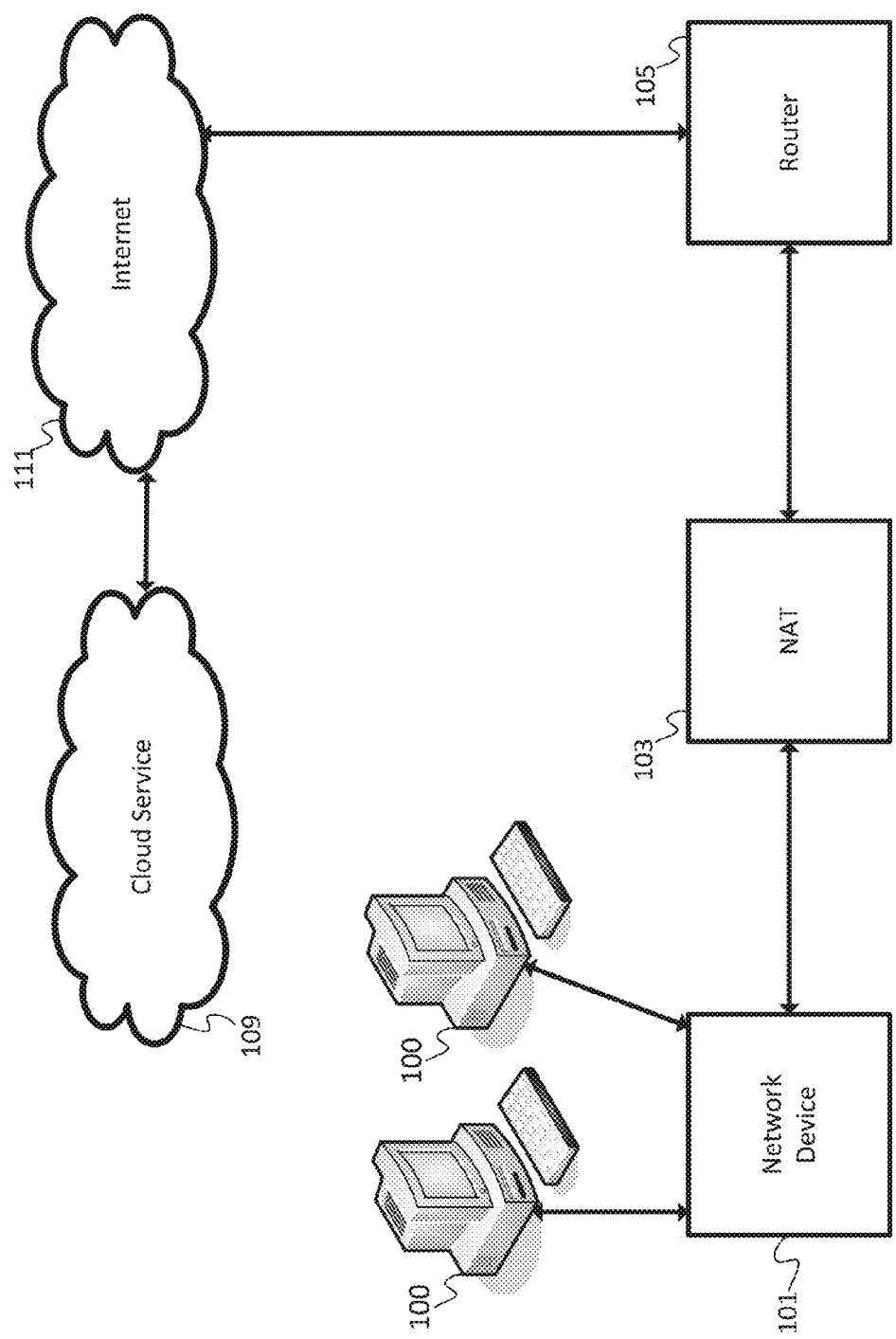
FIG. 1 illustrates an example network for propagating identity information for Internet services.

In one embodiment, a method includes authenticating an endpoint based on a user identity and a credential, generating a hypertext transfer protocol (HTTP) packet including the user identity, sending the HTTP packet including the user identity to a policy enforcement device, and receiving traffic filtered according the user identity from the policy enforcement device.

In another embodiment, an apparatus includes a communication interface and a controller. The communication interface is configured to receive a transmission control protocol (TCP) packet from a host device. The controller is configured to access a user identity based on the TCP packet from the host device and insert the user identity into the TCP packet for a policy enforcement device, wherein the user identity is defined by a preceding hypertext transfer protocol packet received from the host device, and wherein traffic is filtered according the user identity by the policy enforcement device.

In another embodiment, a method includes receiving a packet including a session identification value, extracting the session identification value from the packet, querying an identity database using the session identification value to access user identity information for a source of the packet according to an internet protocol (IP) address of the source of the packet, generating a web security packet comprising a header including the user identity information, and forwarding the web security packet to a policy decision point.

In another embodiment, an apparatus includes a memory configured to store session identification values in association with user identities, a processor configured to extract a user identity from an a hypertext transfer protocol (HTTP) packet and generate a web security packet comprising a header including the user identity, and a communication device configured to forward the web security packet to a policy decision point.

EXAMPLE EMBODIMENTS

Some Internet services utilize hypertext transport protocol (HTTP) based authentication or HTTP secure (HTTPS) authentication. The term HTTP refers to either HTTP or HTTP secure. The Internet services may be security services including one or more of a firewall, malicious content blocking, or content filtering. The HTTP based authentication may include any IP address based authentication techniques. IP address based authentication techniques include WebAuth, http-basic, Windows NT local area network manager (NTLM) authentication protocol, Kerberos protocol, or another technique. Due to an intermediary device between the Internet services and endpoints, traditional implementation of the HTTP based authentication cannot effectively authenticate endpoints because the public address is shared by multiple users. The intermediary device may be a NAT device, a proxy server, or another device that modifies IP address fields of data packets.

In other systems, even when the intermediary device is aware of unique IP addresses for the endpoints, the endpoints must be authenticated twice. Once by the access switch for gaining access to the network and a second time by the security device (e.g., L7 authentication) in order to enforce policies based on the identity of the user. For IPv6 addresses, another problem is addressed. In an IPv6 system, each endpoint has a unique address. The unique addresses may be used to track an endpoint across multiple services (e.g., banking, browsing, content streams, and others) by an adversary device configured to snoop traffic. In order to prevent unwanted tracking and for other privacy reasons, some endpoint devices may generate multiple IPv6 addresses for each HTTP connection. For example, endpoints devices may employ the techniques described in Privacy Extensions for Stateless Address Auto-configuration in IPv6, RFC 4943 published September 2007. When multiple IPv6 addresses are used, each address must be re-authenticated for the host.

To address these concerns, a network device is configured to modify traffic from an endpoint before the traffic reaches the intermediary device. The network device reads the source address from data packets in the traffic and generates a separate field to propagate the identity of the endpoint along with web traffic flows in the form of inline headers so that network devices further downstream in the network can read or snoop the web traffic flows and identify the endpoints. Another device, such as an edge router, may be configured to remove the inline headers added by the network device. Further, an identity cache or identity database may be populated with the identity before forwarding future traffic flows to the Internet. Thus, even if the web traffic traverses the intermediary device, subsequent network devices are able to access the real identity of the endpoint. The web traffic may include any type of transmission control protocol (TCP) session sessions from the host such as file transfer protocol (FTP), simple mail transfer protocol (SMTP), HTTP, HTTPS or any other L7 protocol over TCP. The identity may be carried in synchronization packet (e.g., USER_HINT_TCP) for any L7 protocol using TCP, which is used by the edge router to query the identity database or identity cache.

FIG. 1 illustrates an example network for propagating identity information for Internet services. The network includes hosts 100, a network device 101, a NAT device 103, and a router 105. The network is coupled to the Internet 111 and a cloud service 109. Additional, fewer, or different devices may be included in or coupled to the network.

One or more of the hosts 100 is in communication with the network device 101. The hosts 100 may be any type of endpoint on the network. The endpoints may be personal computers, mobile devices, set top boxes, tablet computers, or any computing device configured for network communication. The network device 101 is configured to authenticate the endpoint or host 100 using at least a user identity and a credential.

The user identity may be a username, an IP address, a hostname, or other identifying data that uniquely identifies the endpoint at least on the local area network. The credential may be a password, a certificate file, a secret key, a cryptographic file, or a pretty good protection (PGP) key. In one example, the credential may be an access code from a receipt, a hotel key, or other type of code made available in semi-public networks. The network device 101 is configured to access a user database according to the user identity and the credential in other to determine that the endpoint is an authorized user on the local area network.

The network device 101 may be a data switch or a server. The network device 101 generates or modifies a hypertext transfer protocol (HTTP) packet to include the user identity. The user identity is included in an inline header. The inline header is not part of the control portion of the HTTP packet. The inline header may be added to the request before the content-type field. The inline header may be any location in the HTTP that is not modified or removed by a NAT device.

The network device 101 sends the HTTP packet including the user identity to a policy enforcement device. The policy enforcement device may be the router 105. The router 105 is configured to detect, filter, restrict, or permit data traffic flows from the Internet 111 to the network device 101. The policy enforcement device may be configured to generate a request message that requires a policy decision and send the request message to a policy decision point at the cloud service 109. The policy decision point is configured to generate and return a policy decision and send the policy decision to the router 105.

The router 105 is configured to enforce the policy by applying the policy to received data packets. The router 105 may block some data packets according to the policy and forward some data packets according to the policy. In other words, the cloud connector uses the policy to filter traffic, and the policy is based on the user identity. The network device 101, through NAT device 103, receives traffic from the policy enforcement device in agreement with the enforced policy.

In one implementation the router 105 enforces a subset of the policy. The router 105 enforces policies only on some traffic, and the rest of the traffic would be re-directed to the cloud service 109, acting as a policy enforcement point. The cloud service 109 may be configured to inspect the traffic and further enforce identity based policies, detect malware, Trojans, or other malicious software. The router 105 acts as proxy, transferring the identity details to the cloud service 109 in encrypted HTTP headers or transferring the traffic using a tunnel.

The policy may have a temporal component and a content component. The content component may restrict specific types of Internet content, such as adult content, social media content, gaming content, media sharing content, video content, or audio content. The content component may restrict specific web addresses, uniform resource locators, or IP addresses. The content component may include a keyword used to filter traffic.

The temporal component may restrict access at certain times. The time restrictions may apply to all content or tied to specific types of content listed by the content component. For example, the policy may be enforced only between the hours of 9:00 A.M. and 5:00 P.M.

The router 105 may be an integrated services router (ISR) configured to execute software for connecting to cloud service 109. The ISR may be configured to retrieve identity parameters such as username, group name, and other identity information in order to enforce security policies based on the identity of the user. The ISR is located downstream of the NAT device with respect to outgoing data packets from the hosts 100.

In one implementation, network devices downstream of the NAT 103 are configured to access the user identity from the HTTP flow. The network devices may be connected through the Internet 111 (e.g., cloud service 109), or the network devices may be with the local network or in the enterprise network of the host 100. The network devices are configured to glean authentication information from the user identity in the inline headers. Accordingly, the network devices may omit an explicit authentication mechanism for the host 100. Instead, the authentication information may be made at wire speed.

Figure 2:
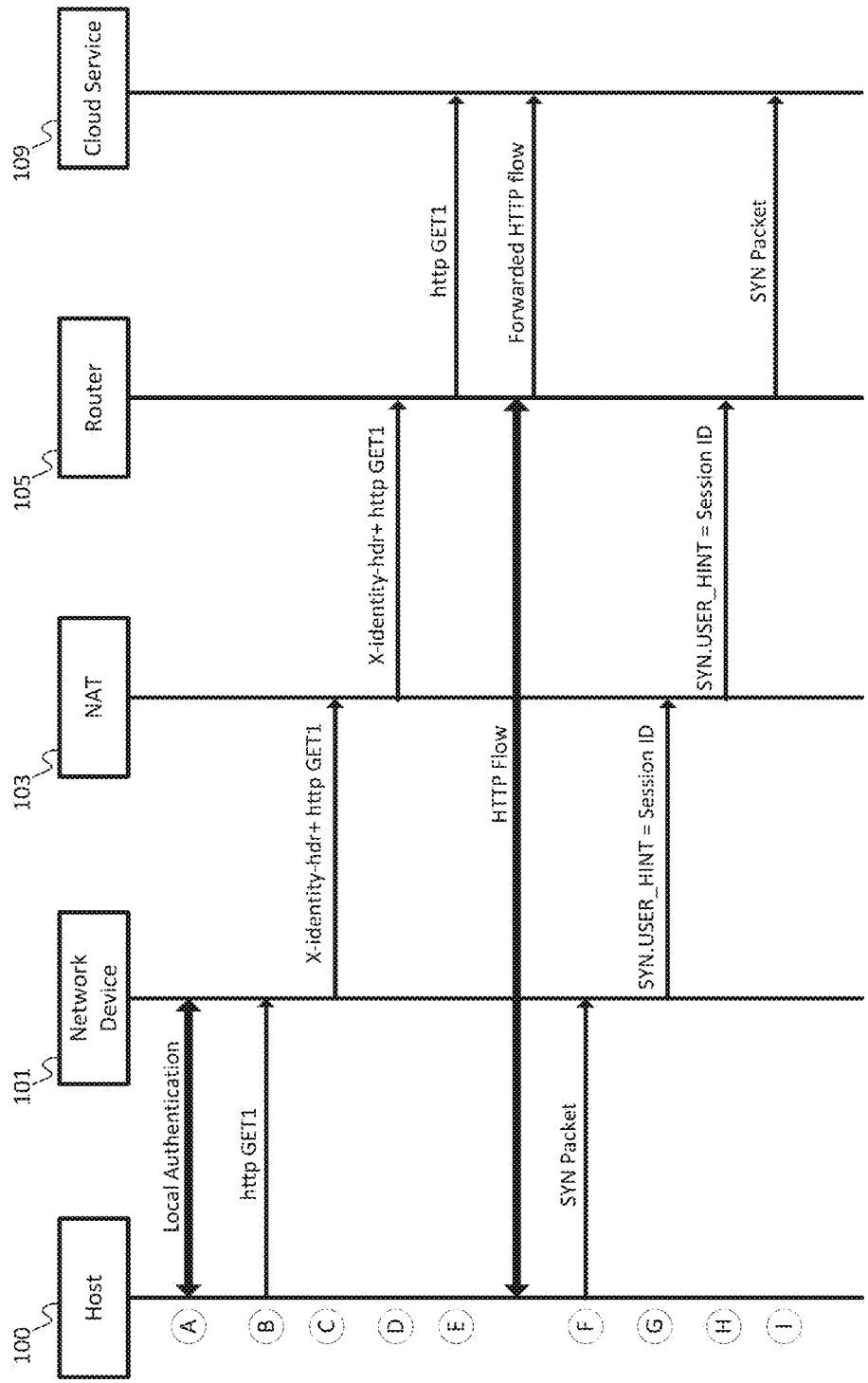
FIG. 2 illustrates an example of a timing chart for the network of FIG. 1.

FIG. 2 illustrates an example of a timing chart for the network of FIG. 1. Time is measured vertically in the timing chart but is not shown to scale. Stage A includes local authentication between the host 100 and the network device 101. The local authentication may be performed using any authentication protocol. The authentication protocol may be 802.1x (dot 1x), media access control (MAC) authentication bypass (MAB), or web authentication.

Authentication in 802.1X includes interaction between three entities, a supplicant such as host 100, an authenticator such as network device 101, and an authentication server to support the authenticator. The network device 101 does not allow the host 100 access to the protected side of the network until the identity of the host 100 has been validated. The host 100 provides credentials including one or more of a username, a password, and/or a digital certificate to the network device 101. Other credentials may be used. The network device 101 may authenticate the credentials or forward the credentials to the authentication server for authorization.

MAB involves port-based access control using the MAC address of the host or endpoint. Specific ports may be dynamically enabled or disabled by the network device 101 using the MAC address of the device connected. MAB avoids the need to examine single packets to authenticate the source MAC address. After MAB, the endpoint's identity is known and all traffic from the endpoint may be allowed.

Web authentication (WebAuth) may be a supplement to or substitute for 802.1X authentication. WebAuth may be deployed in public hotspots (e.g., hotel rooms or coffee shops). The host 100 launches a browser in order to be authenticated with the network device 101 using WebAuth. In WebAuth, credentials may be entered in we-based login pages. With WebAuth, every port in the network device 101 may be configured in the same way. The WebAuth process links the username with an IP address, a MAC address, a switch, and a port. The host 100 may be configured to attempt authentication with 802.1X and, if unsuccessful, fall back to authentication using WebAuth or MAB.

At stage B, the host 100 sends an HTTP GET request to the network device 101. The HTTP GET request is a command to retrieve data from a URL. The HTTP GET request is modified by the network device 101 to include identity information obtained during the local authentication with the host 100. The identity information may be named, for example, "X-identity-hdr" as shown in FIG. 2.

The network device 101 is configured to generate a variety of identity signatures using X-identity header entities. The HTTP packet may also include a signature for the header field values.

The entity X-Identity-username is an alphanumeric value for the username of any endpoint, such as host 100. The entity X-Identity-usergroups is an alphanumeric value for the group name or usergroup of any endpoint, such as host 100. The entity X-Identity-nodelocation is an alphanumeric that describes the location of any endpoint, such as host 100. The location may describe the physical location of the endpoint (e.g. 1st Floor, Research Lab, Acme Corporation).

The entity X-Identity-nodedevicetype is an alphanumeric value that describes the device type of the endpoint. The device type may be laptop, personal computer, tablet, smartphone, or other computing device type. The device type may indicate whether the device is company provided or a personal device. The entity X-Identity-nodeaccesstype is an alphanumeric value that describes the access type of the endpoint. The access type may be may be wired, wireless, public, private, or another value.

The entity X-Identity-node-uniqueid is a value for the authentication session ID. The authentication session ID may be a numerical value. The authentication session ID may be generated from an access protocol, such as the authentication, authorization, and accounting protocol (AAA). AAA tracks all the users successfully gaining access to the network and generates a unique Authentication Session ID value per user. Alternatively, the authentication session ID may be generated by the network device 101 using a combination of one or more of the IP address of the network device 101, the MAC address of the host 100, the IP address of the host 100, and a timestamp.

The entity X-Identity-sourceaddress is a numerical value for the IP address of any endpoint such as the host 100. The IP addresses may be in an IPv6 address or an IPv4 address. The IP address of the endpoint is another example of identity information.

The entity X-Identity-forwarder is a numerical value for the IP address of the network device 101, or any device inserting the X-identity headers into data packets. The X-identity-forwarder may be an IPv6 address or an IPv4 address.

The entity X-Identity-flowtimeout is a numerical value describing the valid time of the identity information in seconds. The timeout value is generated by the network device 101. The timeout value is decremented over time (i.e., decremented every second). Once the timeout value reaches zero, the network device 101 is configured to restart the process. For example, the network device 101 is configured to insert the X-Identity-Hdr for the HTTP request from the host 100 and continue the process.

The entity X-Identity-timestamp is a numerical value that indicates the number of seconds since Jan. 1, 1970 by using a fixed point format. The timestamp allows the system to avoid replay attacks. For example, the current time is sent in X-Identity-timestamp header (e.g., TSnew) by the network device 101. The receiver (e.g., the router 105) checks the reception time of the packet (e.g., RDnew). The receiver computes the difference (RDnew−TSnew) to determine whether the differences is within a permitted range, delta. Examples for delta include 2 seconds, 3 seconds, or another time value. If the timestamp is not within the permitted range, then some other device is trying to replay the message. Clocks are synchronized between the sender and receiver using the network time protocol.

At stage C, the network device 101 combines the identity information in the X-identity header entity and the HTTP GET request in such a way that the NAT device 103 will not modify or remove the X-identity header information. The network device 101 sends the combined identity information and HTTP GET request to the NAT device 103. At stage D, the NAT device 103 forwards the combined identity information and HTTP GET request to a cloud connector included on the router 105. The cloud connector is configured to parse the X-identity header entity or entities from the HTTP GET request to obtain the identity information. Without the added identity information, the cloud connector would not be able to specifically identify the host 100 due to the operation of the NAT device 103.

At stage E, the cloud connector inserts the identity information into the control header of the HTTP GET request. To downstream devices, the HTTP GET request appears to have originated with the host 100 because the identity information identifies the host 100. In one example, the cloud connector is configured to insert the identity information in a header configured specific to the cloud service 109. The identity information may be encrypted such that only the cloud service 109 can decrypt the identity information and identify the host 100. In one alternative, the cloud connector is configured to redirect traffic, including identity information, to the cloud service 109 using a secure tunnel.

The cloud connector may also be configured to store the identity information in an identity cache. The identity cache pairs the identity information of the host 100 with a unique session ID. Subsequent data packets sent by the network device 101 may include the unique session ID rather than the identity information or the X-identity header entities. Specifically, the network device 101 no longer has to modify the transmission control protocol (TCP) session and no longer acts as TCP proxy for subsequent flows. The network device 101 no longer adjusts the sequence number, checksum, and acknowledgement number for subsequent TCP flows. Stages F-I illustrate the established HTTP flow using the unique session ID. At stage F, the host 100 sends a subsequent data packet. The subsequent data packet may be a synchronization packet as shown in FIG. 2. At stage G, the network device 101 is configured to insert a session ID value into the data packet. In one example, the session ID may be transmitted in the SYN.USER_HINT option. The USER_HINT option may be 32 bits or another length. Reasons for using the session ID value, as opposed to the IP address assigned to the host 100, include facilitating tracking at the AAA/Audit Server. The session ID value also allows easier tracking and debugging of events such as re-authentication and change of authorization.

At stage H, the NAT device 103 strips the USER_HINT option from the data packet and forwards the data packet including the session ID to the cloud connector. The USER_HINT option may be accessed very quickly from the data packet. Authentication may effectively be established with the host 100 at wire speed rather than using a separate authentication between network device downstream of the NAT 103 and the host 100.

At stage I, the cloud connector receives the subsequent data packet, extracts the unique session ID, and queries the identity cache with the unique session ID. The cloud connector forwards the subsequent data packets by incorporating the identity information in the control headers or other headers readable by the cloud service 109.

The unique session ID may be defined in the X-identity header entities as the X-Identity-node-uniqueid value, which may be referred to as an authentication session ID and established during the authentication between the host 100 and the network device 101. The authentication session ID may be stored in a USER_HINT_TCP option (user hint transmission control protocol (TCP) option) in the subsequent TCP flows. The USER_HINT_TCP option is defined by the draft, "Revealing hosts sharing an IP address using TCP option" available at the IETF website under "draft-wing-nat-reveal-option-03," published Dec. 8, 2011. However, the USER_HINT_TCP option may be modified to be 32-bit rather than 16-bit described in the draft because the USER_HINT_TCP is no longer limited by the Internet. Because the edge router removes the USER_HINT_TCP option before propagating the data packet outside of the local network to the Internet 111. Also, the 2-minute lifetime specified in the draft may be omitted or modified.

The use of the USER_HINT_TCP option avoids the modification of application level payload for subsequent TCP flows. The cloud connector is configured to access the USER_HINT_TCP option and use the USER_HINT as a primary key to fetch the identity information in the identity cache. The USER_HINT_TCP option may be removed by the router including the cloud connector.

The network device 101 may also be configured to form an identity signature for the X-identity-header entities and include the identity signature for integrity protection. The network device 101 uses some or all of the headers entities or identity attributes, which may referred to as a digest string, that were added to the HTTP request to generate the identity signature. The identity signature may be generated according to a message authenticate code (MAC) for the identity attributes.

One example digest string may be "X-Identity-username|X-Identity-usergroups|X-Identity-location|X-Identity-nodedevicetype|X-Identity-nodeaccesstype|X-Identity-node-uniqueid|X-Identity-forwarder|X-Identity-sourceaddress|X-Identity-flowtimeout|X-Identity-timestamp."

The MAC may be hash based. For example, the MAC may be a SHA-1 cryptographic hash function. The MAC may use a secret key shared between the network device 101 and a receiver, such as the router including the cloud connector or the cloud service 109. The receiver computes the MAC using the shared secret key. If the resulting value does not match the contents of X-Identity, the receiver discards the request and generates an alarm to the administrator that a "man-in-middle" attacker device is trying to act as the network device 101.

The network device 101 may use certificates, pre-shared keys, or group key provided by a Group Controller and Key Server to generate the identity signature, as described in the Multicast Group Security Architecture RFC 3740, published March 2004 and available at the IETF website as "rfc3740.txt." For further confidentiality, MACsec may be used. On one example, the network device 101 and the router 105 including the cloud connector) each has a pre-shared key or group key provided by Group Controller and Key Server.

Figure 3:
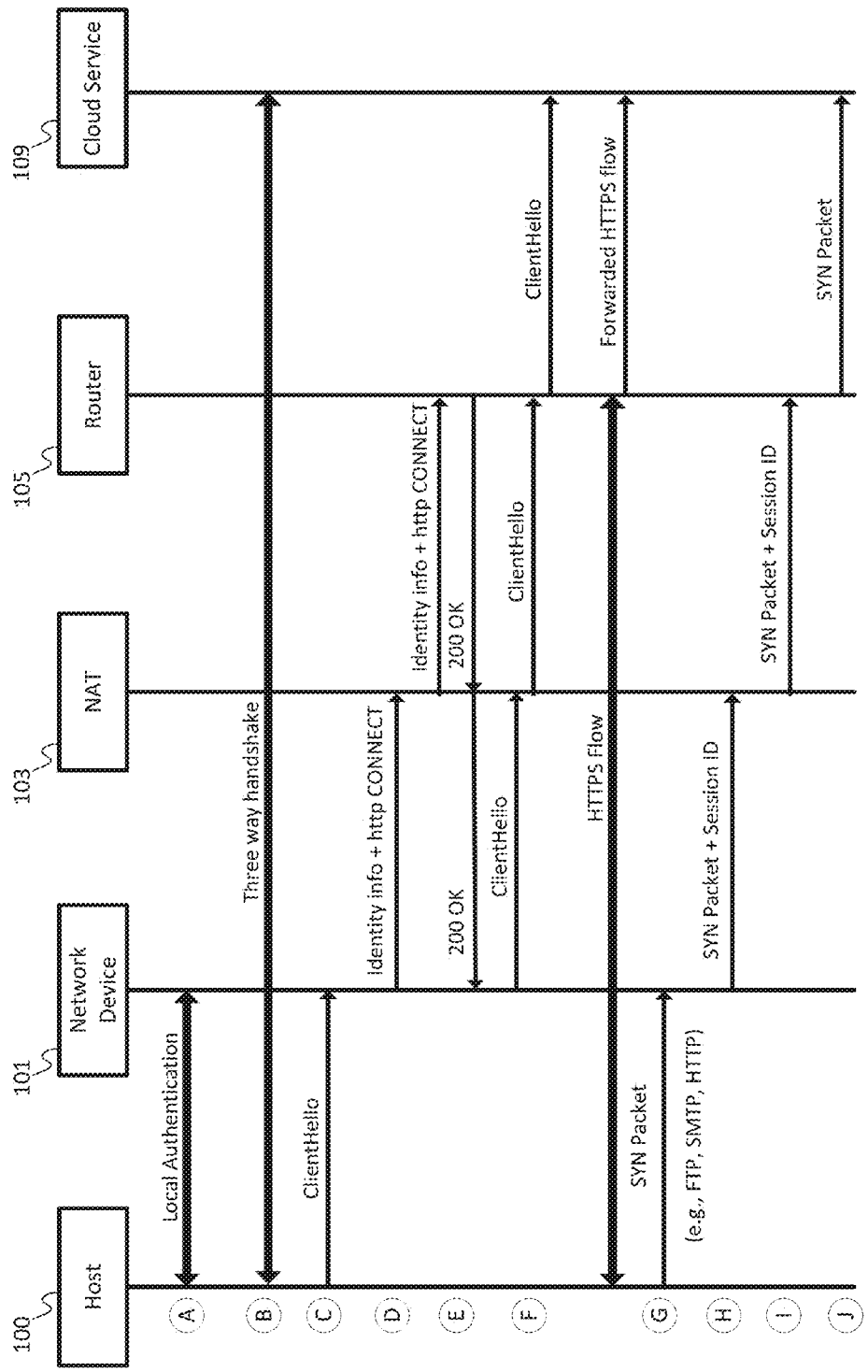
FIG. 3 illustrates another example of a timing chart for the network of FIG. 1.

FIG. 3 illustrates another example of a timing chart for the network of FIG. 1 for use with HTTP secure (HTTPS). HTTPS adds the security capabilities of Secure Sockets Layer (SSL) and Transport Layer Security (TLS) to the HTTP flow. Examples of HTTPS sessions include banking websites, securities trading, web retailers, and others.

At stage A, local authentication between the host 100 and the network device 101 is performed. The local authentication may take any of the forms discussed above.

At stage B, a three way handshake is performed between host 100 and a server on the Internet 111 (e.g., cloud service 109), which is another host. The three way handshake may be performed using Transmission Control Protocol (TCP) using three messages transmitted by TCP to negotiate the TCP session. The three messages include a synchronize packet, a synchronize-acknowledgement packet, and an acknowledgement packet. For example, the host 100 sends a synchronize packet to the server. The server responds with a synchronize-acknowledgement packet, and the host 100 responds with an acknowledgement packet. As a result, the TCP socket connection is between the host 100 and the server is established.

At stage C, the host 100 generates and sends a TLS ClientHello packet to the network device 101. The TLS ClientHello packet is part of a Simple TLS handshake including a negotiation phase and an authentication phase. At stage D, the network device 101 intercepts the ClientHello packet and stores the ClientHello packet in a buffer. The network device 101 is configured to generate a new HTTP connect request within the context of the ongoing HTTPS session to the server on the Internet 111. The network device 101 includes the identity information in the HTTP connect request. The identity information may include any of the forms described above. The HTTP connect request including the identity information is forwarded to the NAT device 103.

At stage E, the NAT device 103 alters the IP address and port of the HTTP connect request packet according to a network address translation table. The NAT device 103 forwards the HTTP connect request including the identity information to the server on the router including the cloud connector 105.

The router 105, including the cloud connector, is configured to parse the identify information (e.g., X-identity-headers) and remove the HTTP connect request. The identity information may be stored in an identity cache. Subsequently, the cloud connector includes the identity data fetched from the identity cache in a header that the cloud service 109 recognizes. Also at state E, the cloud connector is configured to send an HTTP 200 OK packet back to the network device 101 by way of the NAT device 103. In response to receipt of the HTTP 200 OK packet, the network device 101 is configured to send the stored ClientHello packet and further proceed with TLS.

At stage F, the network device 101 sends the previously buffered ClientHello packet to the server on the Internet 111 by way of the NAT device 103 and the router. When the network device 101 receives a response (e.g., a confirmation message from the policy enforcement device) for the ClientHello packet, the network device 101 bridges the HTTPS session between the client and the server, adjusting the TCP sequence numbers. The HTTPS session is bridged by the cloud connector acting as TCP/HTTP proxy. At the TCP level, the cloud connector, modifies the sequence, ACK numbers, and re-calculates the checksum. At the HTTP level, the cloud connector 105 parses the HTTP connect request and generates a 200 OK message.

At stage G, the host 101 sends a subsequent data packet. The subsequent data packet may be part of a TCP flow. The subsequent data packet need not be an HTTP or HTTPS data packet. Any type of L7 protocol may be used. Example L7 protocols include FTP and SMTP to propagate the identity across the NAT. At stage H, the network device 101 is configured to insert a session ID value into the data packet. At stage I, the NAT device 103 forwards the data packet including the session ID to the cloud connector. At stage J, the cloud connector is configured to receive the subsequent data packet, extract the unique session ID, and query the identity cache with the unique session ID. The router 105 forwards the subsequent data packets by incorporating the identity information in the control headers or other headers readable by the cloud service 109. The cloud connector and cloud service 109 may use a secure tunnel to exchange traffic. In one example, the session ID is inserted in a TCP synchronization packet and not in any other TCP data packet.

Figure 4:
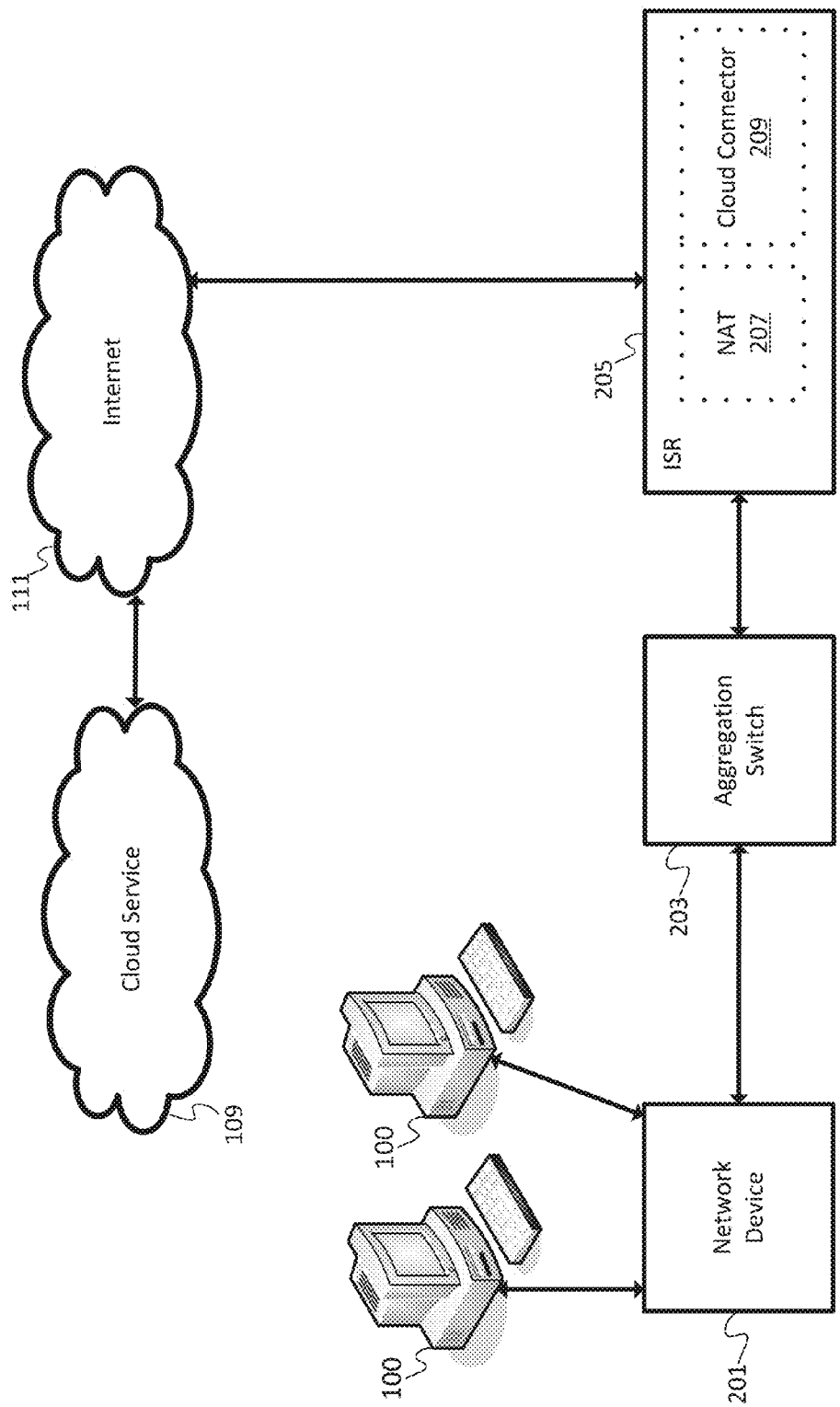
FIG. 4 illustrates another example network for propagating identity information for Internet services.

FIG. 4 illustrates another example network for propagating identity information for Internet services. The network includes hosts 100, a network device 201, an aggregation switch 203, and an integrated service router (ISR) 205 incorporating a NAT device 207 and a cloud connector 209. The network is coupled to the Internet 111 and a cloud service 109. Additional, few, or different devices may be included in or coupled to the network.

The aggregation switch 203 is an example of an intermediate device on the network that is configured to use the identity information propagated by the network device 201. The aggregation switch 203 may be configured to enforce a quality of service (QOS) polity based on the identify information. For example, the aggregation switch 203 may query a QOS database to identify a quality level associated with the identity information. Alternatively, the aggregation switch 203 may query the AAA server to receive a quality level associated with the identity information. Based on quality levels of different packets, priorities are set in forwarding data packets through the network.

The ISR 205 includes the NAT device 207 and the cloud connector 209. Therefore, the cloud connector 209 generally has access to the addresses of the host 100. However, the cloud connector 209 conventionally would require a separate authentication of the host 100. Using the identity information and identity cache, a second authentication is not needed.

Figure 5:
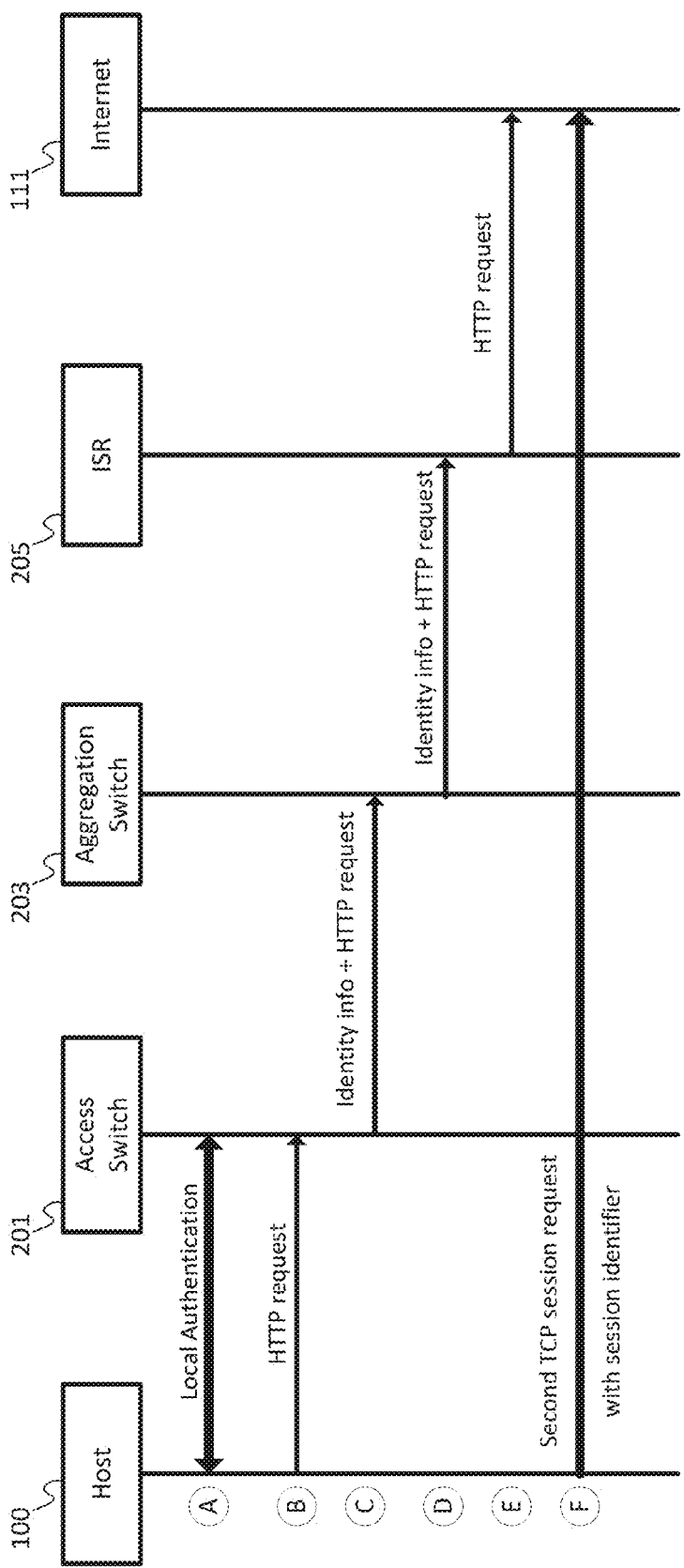
FIG. 5 illustrates an example time chart for the network of FIG. 4.

FIG. 5 illustrates an example time chart for the network of FIG. 4. At stage A, local authentication between the host 100 and the access switch 201 is performed. The local authentication may take any of the forms discussed above. At stage B, a HTTP request is generated at the host and forwarded to the access switch 201. At stage C, the access switch 201 inserts the identity information into the HTTP request and forwards the combination to the aggregation switch 203.

The aggregation switch 203 may use the identify information to perform a lookup in a QOS database. The QOS database associated priority levels with different endpoints to maintain a QOS level for later traffic flows. At stage D, the aggregation switch forwards the combination of the HTTP request and the identity information to the ISR router 205. At stage E, the ISR router 205 is configured to parse the identify information (e.g., X-identity-headers) and remove the HTTP connect request. The identity information may be stored in an identity database. The ISR router 205 forwards the HTTP request to the Internet 111, and the HTTP request may be forward to other Internet services. Subsequently, when the host 100 generates a second request, the ISR router 205 accesses the identity database to retrieve the identity information. The second request may be any type of TCP connection (e.g., HTTP, HTTPS, FTP, SMTP, or another type). For example, the second request may be a SMTP TCP session request carrying the unique session identifier in a SYN packet. The ISR router 205 inserts the identity information in the second HTTP request before forwarding the request to the Internet 111.

The access switch 201 is configured to add the X-identity header entities in the HTTP flow again for the endpoint when the authentication session times out, otherwise expires, or when one or more attributes of the endpoint change or events occur. Example attributes or events include the expiration of an IP address lease, a user logs-off and logs-on again, or the host 100 reboots.

The access switch 201 is configured to join and listen to a new multicast address for restart announcements from ISR 205. Whenever the ISR 205 restarts or enters into another situation where the ISR router 205 loses all the identity cache, the ISR sends a multicast restart announcement to notify that the access switch should start adding the X-identity header entities for the endpoints.

Optionally, as a fall back mechanism, when the ISR 205 receives web traffic when there is no X-identity header entities present or located in the identity cache, the ISR 205 may enforce any other authentication mechanisms. Other authentication mechanism include but are not limited to WebAuth, http-basic, Windows NT local area network (LAN) manager (NTLM) authentication protocol, Kerberos protocol, or another technique.

The cloud service 109 is an example of software as a service (SaaS). The cloud service may be Cisco ScanSafe Cloud Web Security provided by Cisco Systems, Inc. of San Jose, Calif. The cloud service 109 provides security services. Security services include malicious software blocking, content filtering, and statistics gathering. Security services provide malicious software blocking as protection against viruses, spyware, and other malware that targets the mobile nodes. Security services provide content filtering to limit the types of content received at the mobile node. The content filtering may be based on parental controls, or specifically tailored filtering for mobile hotspots or public networks. The content filtering may be based on a user profile. Security services provide statistics gathering by counting data flows. For example, a number of packets or a quantity of data in a flow may be counted and reported to a service provider. Alternatively or in addition, the cloud service 109 may provide spam filtering. The cloud service 109 may include an email filter. The email filter may include criteria such as keywords, address munging, and a list of known spammers.

Figure 6:
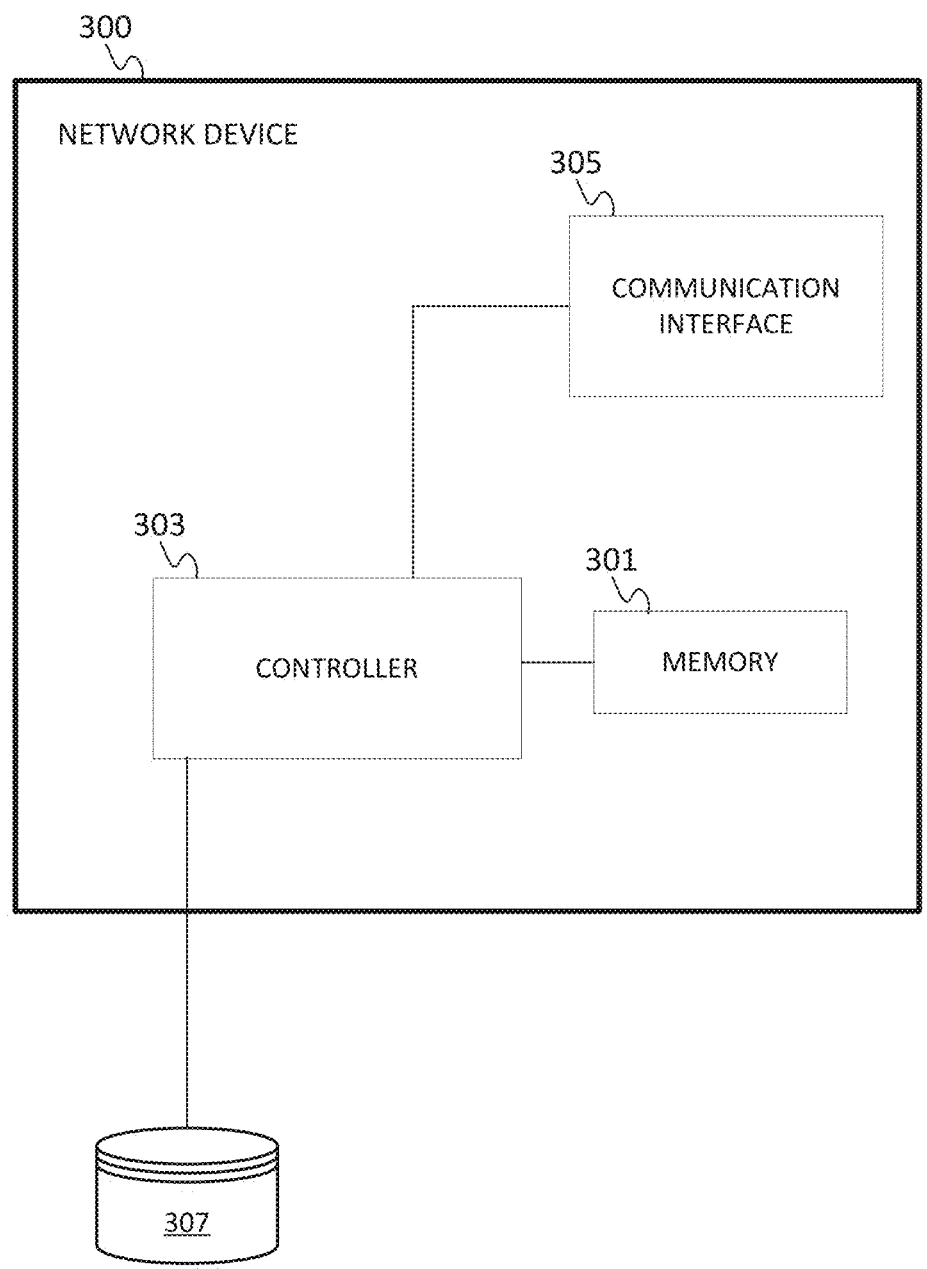
FIG. 6 illustrates an example network device for propagating identity information.

FIG. 6 illustrates an example network device 300 for the networks of FIG. 1 of FIG. 2. The network device 300 includes at least a memory 301, a controller 303, and a communication interface 305. In one example, a database 307 stores possible session ID values. Additional, different, or fewer components may be provided. Different network devices may have the same or different arrangement of components.

The network device 300 may correspond to network device 101 or the router including cloud connector 105. In the case of network device 101, the communication interface 305 is configured to receive a TCP packet and from a host device. The host device may be any endpoint on the local network configured to send and receive IP traffic. The controller 303 is configured to access a user identity based on the TCP packet from the host device and insert the user identity into the TCP packet for a policy enforcement device. The policy enforcement device accesses one or more policies associated with the host device. The policy enforcement device filters traffic that is destined for the host device according to the policies. The policies may put content restrictions or time restrictions on traffic destined for the host device. The memory 301 or database 307 may store user identities paired with credentials and/or IP addresses of the host devices.

In the case of the router including cloud connector 105 or the ISR router 205, the memory 301 or database 307 is configured to store session identification values in association with user identities. The controller 303 is configured to extract user identity from an HTTP packet and generate a web security packet comprising a header including the user identity. The web security packet is forwarded to a policy decision point. The policy decision point may be a security as a service server. The policy decision point returns a policy to the controller 303, which is configured to filter traffic for the source of the HTTP packet according to a policy rule received from the policy decision point.

The controller 303 may include a general processor, digital signal processor, an application specific integrated circuit (ASIC), field programmable gate array (FPGA), analog circuit, digital circuit, combinations thereof, or other now known or later developed processor. The controller 303 may be a single device or combinations of devices, such as associated with a network, distributed processing, or cloud computing.

The memory 301 may be a volatile memory or a non-volatile memory. The memory 301 may include one or more of a read only memory (ROM), random access memory (RAM), a flash memory, an electronic erasable program read only memory (EEPROM), or other type of memory. The memory 301 may be removable from the network device 100, such as a secure digital (SD) memory card.

In addition to ingress ports and egress ports, the communication interface may include any operable connection. An operable connection may be one in which signals, physical communications, and/or logical communications may be sent and/or received. An operable connection may include a physical interface, an electrical interface, and/or a data interface.

Figure 7:
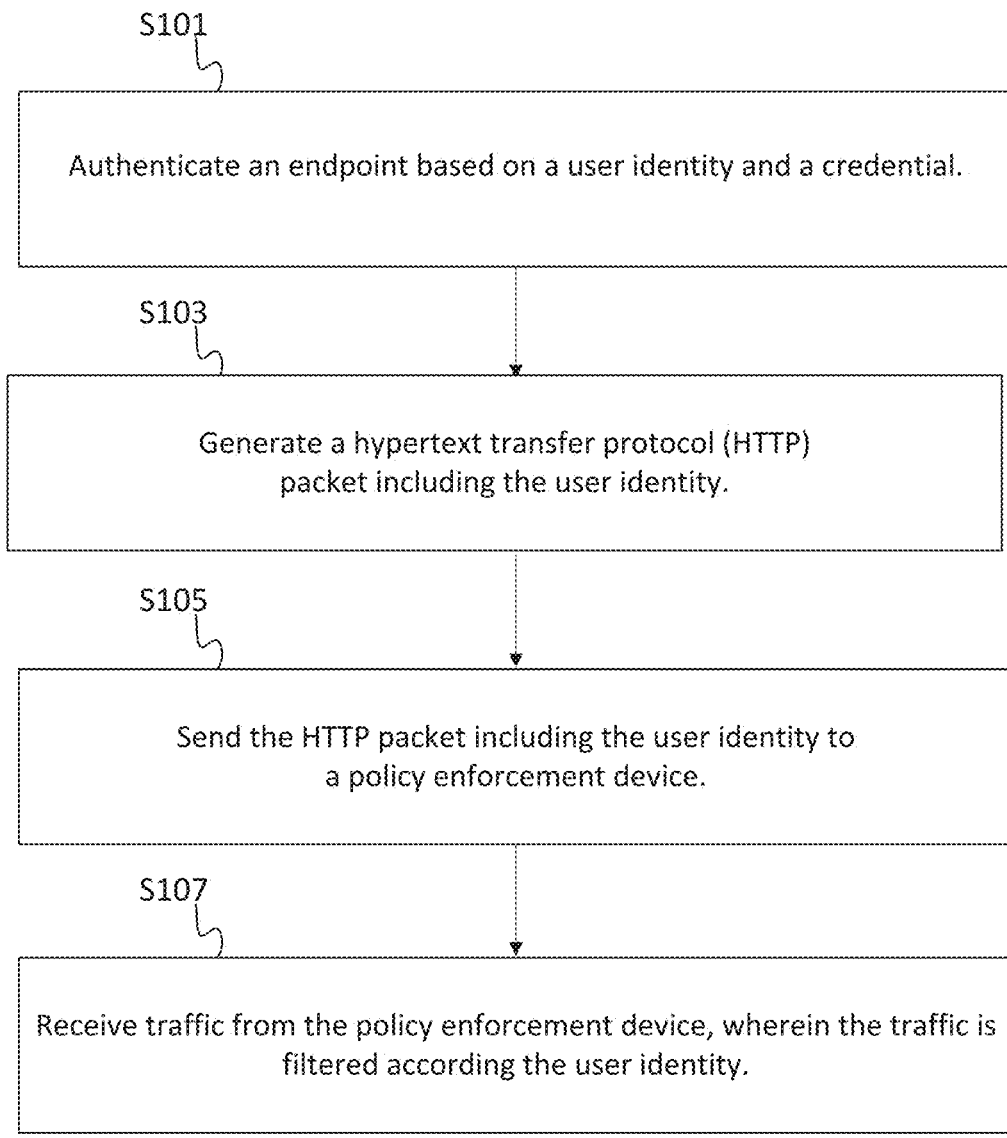
FIG. 7 illustrates an example flowchart for propagating identity information for Internet services.

FIG. 7 illustrates an example flowchart for propagating identity information for Internet services. The acts in FIG. 7 may be performed by the network device 101 or another device. Additional, different, or fewer acts may be provided. The acts are performed in the order shown or other orders. The acts may also be repeated.

At act S103, the network device 101 authenticates an endpoint based on a user identity and a credential. The authentication may be any web-based authentication. The user identity, the credential, or both may be received from the endpoint. When only the credential is received from the endpoint, a database may be accessed using the source address of the endpoint to determine the user identity.

At act S103, a HTTP packet including the user identity is generated. In one example, the HTTP packet is received from the endpoint and the user identity is inserted into the HTTP packet. In another example, the HTTP packet is received including the user identity. The user identity may be the username of a user at the endpoint, a groupname of a user, a workstation name, or another name. The user identity may indicate an access level of the user. The user identity is at a location in the HTTP packet that is shielded from a NAT device or another intermediate.

At act S105, the HTTP packet is sent to a policy enforcement device. The policy enforcement device may be local to the network or the policy enforcement device may be accessed via the Internet. The policy enforcement device applies policies to traffic headed to or from the endpoint. A policy may block all traffic from the endpoint at certain times or in certain situations. For example, traffic may be blocked outside of business hours, during high congestion times, or if an emergency has occurred. A policy may block certain types of traffic for certain users. At act S107, traffic is received from the policy enforcement device according to a policy that filters the traffic according to the user identity.

Figure 8:
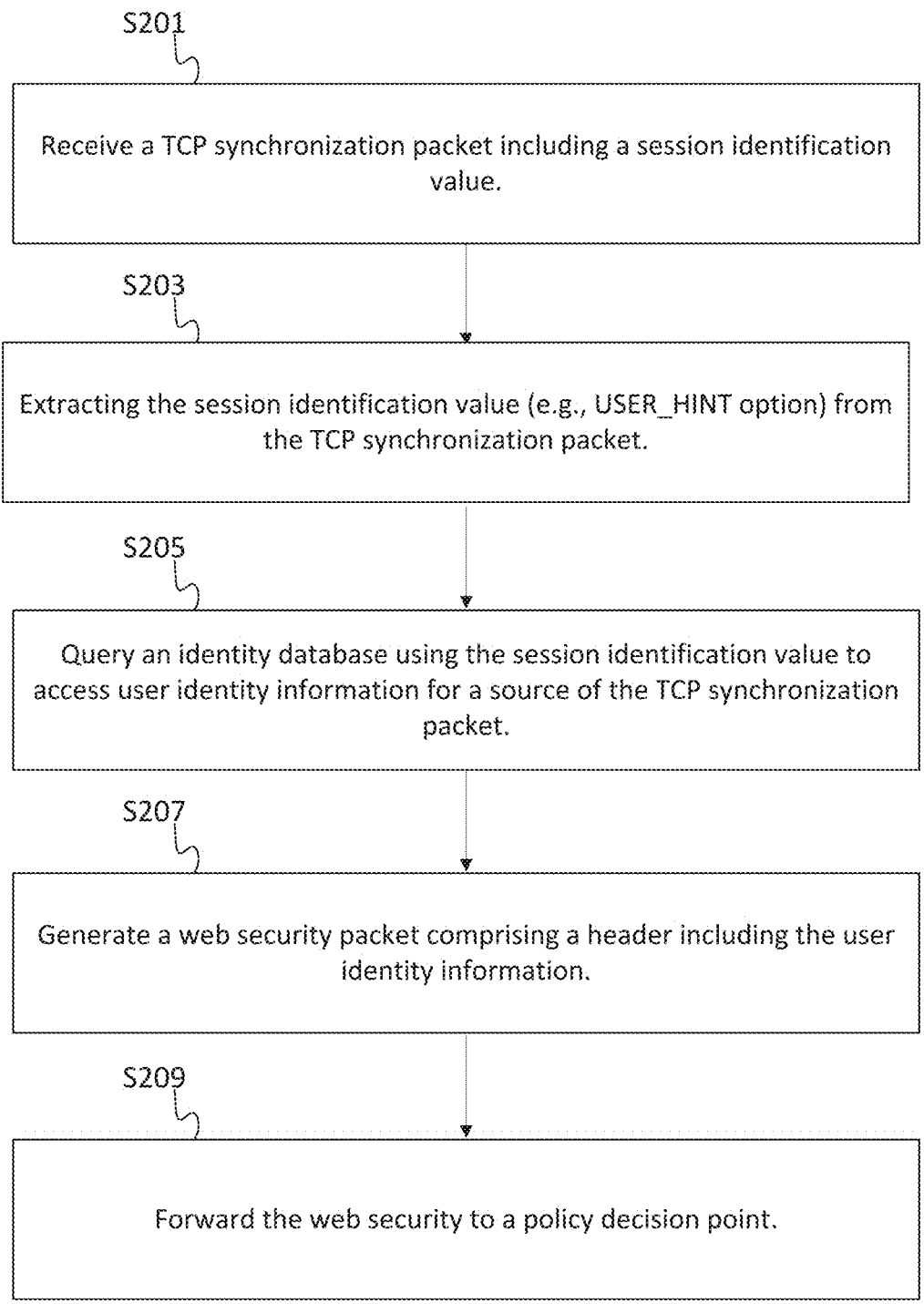
FIG. 8 illustrates an example flowchart for enforcing policies using identity information.

FIG. 8 illustrates an example flowchart for enforcing policies using identity information. The acts in FIG. 8 may be performed by the policy enforcement device or another device. The policy enforcement device may be combined with a policy decision point. Alternatively, the policy decision point may be located at another location. Additional, different, or fewer acts may be provided. The acts are performed in the order shown or other orders. The acts may also be repeated.

At act S201, the policy enforcement device receives a TCP synchronization packet including a session identifier value (e.g., USER_HINT OPTION). The session identifier value may be generated from an access protocol or generated from data received from the endpoint. The TCP synchronization packet may traverse a NAT device without affecting the session identifier value. At act S203, the policy enforcement device extracts the session identification value from the TCP synchronization packet (e.g., from the USER_HINT option).

At act S205, the policy enforcement device queries an identity database using the session identification value to access user identity information for a source of the TCP synchronization packet. The user identity information may have been received in an earlier HTTP packet. The identity database may include a lookup table including pairs of session identification values and user identities.

At act S207, the policy enforcement device generates a web security packet. The web security packet includes a heading having the user identity information. The web security packet may appear to have originated with the source of the HTTP packet. In other words, the web security packet may include a source IP address of the source of the HTTP packet. At act S209, the policy enforcement device forwards the web security packet to a policy decision point, which may be co-located with the policy enforcement device or located at another location (e.g., cloud service).

The preceding embodiments provide many benefits not achieved by conventional deployments of policy enforcement and/or HTTP based authentication infrastructure. For example, if the IP address of the endpoint changes because of restart or DHCP lease expiry, the router may not be aware of those events, which results on an unreliable identity cache on the routers. As another example, if the user on the endpoint logs off and another user logs in on the same device, the router may be unaware of the new user identity. The identity cache described above avoids these concerns.

In other examples, a WebAuth mechanism requires a browser to have Java script enabled, which is deemed insecure by some enterprises. The preceding embodiments provide an alternative to WebAuth.

Further, a router restarts results in all users re-authenticating. This is a high number of HTTP proxy sessions and creates a heavy load on the infrastructure. The preceding embodiments to not require all users to re-authenticate after a router restart. Similarly, in a wireless deployment of next generation campus architecture, the number of authentications and identity bindings are significantly high.

In addition, in 802.1X deployments, switches can more reliably learn when user logs off or the system restarts or IP lease expires and reliably remove the authentication session and privileges associated with the endpoint. Identity header insertion is done once for a session and subsequently only when there is a change in identity. This means that packets do not have to be punted to software processing on the Switches ensuring that performance is not affected.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
   authenticating an endpoint based on a user identity and a credential;
   generating a hypertext transfer protocol (HTTP) packet including the user identity in an inline header;
   sending the HTTP packet including the user identity in the inline header to a policy enforcement device through a network address translation (NAT) device and an edge router, wherein the NAT device does not modify or remove the user identity from the inline header, and wherein the edge router reads the user identity from the inline header and incorporates the user identity into a control portion of the HTTP packet;

receiving traffic from the policy enforcement device, wherein the traffic is filtered according the user identity; and sending a subsequent connection request to the policy enforcement device, wherein the subsequent connection request includes a session identifier, wherein the session identifier is included in a user hint transmission control protocol (TCP) option in a synchronization packet as the subsequent connection request.

2. The method of claim 1, wherein the policy enforcement device is configured to store the identity information in an identity cache.

3. The method of claim 1, wherein the subsequent connection request is defined using file transfer protocol (FTP), a simple mail transfer protocol (SMTP), or another transmission control protocol.

4. The method of claim 1, wherein the user identity comprises data indicative of a username and a group name.

5. The method of claim 1, further comprising:
detecting a restart announcement from the policy enforcement device, wherein the HTTP packet including the user identity is generated in response to the restart announcement.

6. An apparatus comprising:
a communication interface configured to receive a transmission control protocol (TCP) packet from a host device; and
a controller configured to access a user identity based on the TCP packet from the host device and insert the user identity into an inline header of the TCP packet for a policy enforcement device, wherein the user identity is defined by a preceding hypertext transfer protocol packet received from the host device, and wherein traffic is filtered according the user identity by the policy enforcement device,
wherein the controller is configured to forward subsequent TCP flows to the policy enforcement device through a network address translation (NAT) device and an edge router, wherein the NAT device does not remove or modify the inline header and the edge router extracts the user identity from the inline header and inserts the user identity into a control header of the subsequent TCP flows, wherein the subsequent TCP flows include a session identifier in a user hint TCP option.

7. The apparatus of claim 6, wherein the controller is configured to authenticate the host device based on a credential.

8. The apparatus of claim 6, wherein the policy enforcement device is configured to store the identity information in an identity database.

9. The apparatus of claim 6, wherein the user identity comprises data indicative of a username and a group name.

10. A method comprising:
receiving a packet including a session identification value from a network address translation (NAT) device;
extracting the session identification value from outside of a control header of the packet;
querying an identity database using the session identification value to access user identity information for a source of the packet according to an internet protocol (IP) address of the source of the packet;
generating a web security packet comprising a control header including the user identity information from the identity database associated with the session identification value; and
forwarding the web security packet to a policy decision point.

11. The method of claim 10, further comprising:
receiving a policy rule from the policy decision point; and
filtering traffic for the source of the packet according to the policy rule.

12. The method of claim 10, wherein the user identity information is included in a user hint transmission control protocol (TCP) option in the packet.

13. An apparatus comprising:
a memory configured to store session identification values in association with user identities;
a processor configured to extract a user identity from an inline header of a hypertext transfer protocol (HTTP) packet that has passed through a network address translation (NAT) device and generate a web security packet by incorporating the user identity extracted from the HTTP packet into a control header of the web security packet, wherein the NAT device does not modify or remove the user identity; and
a communication device configured to forward the web security packet to a policy decision device.

14. The apparatus of claim 13, wherein the processor is configured to filter traffic for a source of the HTTP packet according to a policy rule received from the policy decision device.

* * * * *